Patented Oct. 18, 1949

2,485,321

UNITED STATES PATENT OFFICE 2,485,321

CORROSION PREVENTIVE COMPOSITION

Knapel F. Schiermeier, Alton, Ill., assignor to Shell Development Company, San Francisco, Calif., a corporation of Delaware No Drawing. Application August 29, 1947, Serial No. 771,386

7 Claims. (Cl. 106—14)

This invention relates to compositions of matter suitable for inhibiting or preventing the rusting and corroding of metal surfaces. More particularly, the present invention pertains to novel compositions of matter which on application to metal surfaces form protective films thereon which are impervious to moisture, corrosive fluids and the like, thereby protecting said metal surface for indefinite periods of time.

It is well known that moisture, corrosive fluids and gases, readily attack ferrous and non-ferrous metals causing corrosion, rusting, pitting and other damage to such surfaces. Also aqueous solutions in contact with metallic surfaces readily attack it and cause corrosion and rusting. Under certain conditions the problem of corrosion becomes exceedingly serious because once started it becomes progressively accelerated. Thus, oils containing small amounts of water become very corrosive to contacting metals. This is due to the fact that oils and particularly liquid petroleum hydrocarbons are very good solubilizers of oxygen and any moisture present therein becomes surrounded by an almost inexhaustible store of oxygen. Moisture under such conditions is inhibited from evaporating and since the rate of transfer of oxygen from hydrocarbons, such as mineral oil or gasoline, to water is limited, ideal conditions for rusting and corrosion are set up. The presence of electrolytes, and formation of corrosive decomposition products in oils and the like also greatly increase the rate of corrosivity.

Under conditions where, in addition to those enumerated, elevated temperature is encountered, corrosion activity is greatly accelerated. Thus corrosion is greatly accelerated when moisture, salt spray and other contaminants or acidic composition products or corrosive gases, come in contact with hot metal bodies or under conditions normally developed in machinery and industrial equipment during operation.

Corrosion of metallic surfaces can attain such an aggravated stage as to cause great fatigue stresses to be set up, which ultimately may result in cracking of the metal.

The problem is particularly serious when metallic parts, machines, such as aircraft engines, and the like are transported over bodies of salt water over long periods of time under humid and high temperature conditions. Unless the metal surfaces are protected with a coating composition which is impervious to the active corrosive producing agents, serious and damaging corrosion sets in.

Metal articles which have been pickled, quenched and otherwise treated and thereafter stored away must also be protected against corrosion until ready for use.

Countless materials and compositions have been tried for protecting metallic surfaces against corrosion by coating said surfaces with a non-reactive, corrosion protective composition, which can be easily removed when desired.

Metal surfaces have been coated or treated with greases, fatty compositions, waxes, organic compounds, e. g. organic acids, amines, inorganic compounds and the like in order to protect them against corrosion. In almost all cases where no chemical reaction occurred between the surface treated and the corrosion or rust inhibitor very little benefit was derived. This is due to the fact that non-chemical reactive inhibitors are incapable of penetrating the surface being protected and are incapable of displacing the contaminant therefrom. In cases where such inhibitors are capable of forming protective coatings on surfaces they are easily displaced by moisture or rupture readily.

Although chemically reactive protective materials are more durable a serious drawback to them is that they change the surface characteristic of the metal which under certain conditions is most undesirable. A coating composition which is non-reactive with contacting surfaces, but which resists penetration by corrosive materials and adheres tenaciously to a surface for intervals desired is generally preferable. This is due to the fact that on removal of the protective coating the metal is substantially in the same state as when originally preserved and thereafter may be treated in any desired manner.

It is an object of this invention to protect metal surfaces in contact with corrosive contaminants by coating said surfaces with a composition having the property of being impervious to corrosive materials. It is another object of this invention to protect metallic surfaces with a coating composition which has no detrimental effect upon the metal surface thus coated. It is still another object of this invention to protect metallic surfaces with coating compositions which resist rupture even at elevated temperatures and which can be readily removed when desired. Other objects will be apparent from the following description.

It has now been discovered that various metal surfaces which are conducive to corrosive influences can be protected simply and effectively by coating with a composition of matter comprising a bitumen base having admixed therewith a substantial amount of a non-aromatic waxy hydrocarbon and a minor amount of a fixed fatty oil. This base may be diluted with equal amounts or less of a light hydrocarbon diluent so as to facilitate application of the coating base on metal surfaces.

The bitumen which comprises the base of the coating composition of this invention may be an asphaltic bitumen obtained by various means during the refinement of crude oils. The asphaltic bitumen specifically may be obtained as a residue from crude oil during the distillation process, or it may be obtained from acid tars in the treatment of lubricating oils with sulfuric acid, or it may be obtained during the deasphaltizing treatment of lubricating oils with solvents.

The production of asphaltic bitumen by distillation from crude oil or topped crude may be carried out under atmospheric pressure or under reduced pressure. The distillation of the crude is continued until the residue in the still obtains the desired penetration. Thus a crude-oil heated to a temperature of 40 to 50° C. is fed into an evaporator where vapors are flashed off and the residue is stripped with the assistance of superheated steam at 280 to 300° C. The residue which is the asphaltic bitumen is drawn off from the evaporator through heat exchangers where it is cooled to 160 to 180° C., and thereafter stored.

The recovery of asphaltic bitumen from acid sludges may be obtained by mixing the acid sludge with water, agitating with air and live steam and thereafter allowing the mixture to settle into three layers. The dilute acid layer settles to the bottom and an oily layer rises to the top, while the middle layer consists of acid tars. The top and bottom layers are removed and the tar acid is further washed with water and agitated with steam and air until all the acid has been removed from the tar. The tar is then heated with superheated steam until the residual pitch has the desired penetration or softening point. If desired, the tars from the middle layer may be admixed with slaked lime to neutralize the acids and thereafter the asphaltic bitumen recovered.

Asphaltic bitumen can be removed from residual oils by the addition of low-boiling hydrocarbons which cause the precipitation of asphaltic materials as a lower layer containing a small amount of the solvent. Thus an oil may be dispersed in butane and heated under pressure. The mixture may then be treated with a solvent such as propane or ethane until the asphaltic material is precipitated. The quality of the asphaltic bitumen thus produced depends upon the nature of the residual oil, the solvent used and other factors.

Asphaltic bitumens obtained by any of the above processes as well as by any other suitable means and source may be used as the base component of the coating composition of this invention. The preferred asphaltic bitumens are those which have softening points of between about 110 and 250 and preferably between 175 to 200. The asphalts may be blown if desired.

Asphalts particularly suited as components of compositions of this invention can be exemplified by having the following properties:

| | |
|---|---|
| Melting point (ring and ball), °F | 175 (water bath) |
| Softening point limits, °F | 175 to approx. 182 (in water bath) |
| Penetration at 77° F | 15 |
| Ductility at 77° F. (5 cm. rate) | 3 |
| Insoluble in 86 Bé. naphtha, per cent | 32 |
| Soluble in CCl₄, per cent | 99.8 |
| Sp. gr. at 77° | 1.021 |

The asphaltic bitumen generally comprises anywhere from 35 to 75% of the coating base and preferably 40 to 50%.

To the asphaltic bitumen is added a minor amount of a non-aromatic waxy hydrocarbon and a minor amount of a fixed fatty oil.

The non-aromatic waxy hydrocarbon may be derived from petroleum fractions such as petroleum distillates or residues, or the waxy hydrocarbons may be produced synthetically by polymerization of olefinic materials by Fischer-Tropsch process or by dehydration of long-chain aliphatic alcohols.

Waxy hydrocarbons may be recovered from suitable petroleum fractions such as Pennsylvania crude, East Texas crudes, Mid-Continent crudes and the like by de-asphaltizing the hydrocarbon and thereafter removing the wax from the asphalt free hydrocarbon fraction by any known suitable means. The asphalt may be separated from the oil either by distillation or solvent extraction and used as a component of composition of this invention. In the solvent process a solvent is selected in which the oil is relatively soluble but in which the asphaltic materials are relatively insoluble. Among such solvents are the light liquid hydrocarbons such as ethane, propane, butane, as well as naphtha and gasoline. Oils treated with such solvents extract the oil and wax leaving behind the asphaltic materials as residue which can be utilized as a component of composition of this invention. The wax-oil mixture may be removed from the asphalt-free solution by chilling the solution, and then separating the precipitated wax by settling, filtering or centrifuging. Waxy materials thus produced are known in the art as slop waxes, petrolatum stock, slack waxes, scale waxes, paraffin waxes, plate, mal-crystalline and needle waxes, micro-crystalline waxes and the like. These waxes are differentiated from each other by the degree of deoiling to which they are subjected and all of them may be used provided they are substantially free from aromatics.

De-waxing or separation of the above waxy constituents from the oil may be accomplished by selective solvent treatment using as the diluents liquefied normally gaseous hydrocarbons such as propane, butane, and other corresponding olefins and/or their mixtures as well as oxygen containing liquid organic substances such as alcohols, ethers, esters, ketones, aldehydes, acids and/or their mixtures. These may include methyl, ethyl, propyl, butyl, amyl alcohols; methyl or methylethyl ether; acetones, diethyl, dimethyl, methylethyl, methylisobutyl ketones and the like. Chlorinated hydrocarbons such as carbon tetrachloride or trichloroethylene and mixtures of chlorinated and non-chlorinated hydrocarbons as mentioned above also may be used.

The first step in obtaining waxy constituents from petroleum crudes, for example, such as Mid-Continent crude is to treat said crude with about six volumes of liquid propane so as to remove the asphalt. The propane from the propane-oil solution is vaporized so that the ratio of propane to oil is reduced approximately 2 to 1. The solution is then chilled to about −40° F. and lower causing separation of the wax from the oil. The wax can be removed by filtration and the propane separated from the de-asphalted and de-waxed oil and waxy material by distillation.

Waxy materials can also be recovered from distillate or residuum lube oil fractions and these wax fractions can be split still further into special wax cuts having desired characteristics by use of selective solvents. This is based on a difference in solubility of different waxy fractions in a given solvent. Thus, when using a methylethyl ketone type solvent the aromatic constituents can be removed by successively cooling the mixture down to between about −40 to −60° C. so as to remove the aromatics which become substantially soluble in the solvent as the temperature is lowered while the straight-chain waxes and isoparaffins become substantially insoluble in the solvent. The straight-chain waxes can be separated from the isoparaffins by extraction and fractional crystallization. Depending upon the distillate cut used waxes of from 12 to above 36 carbon atoms and higher can be obtained.

Instead of obtaining natural waxy materials from petroleum fractions, straight-chain waxes can be produced synthetically by polymerization of olefines under pressure or dehydrating long-chain fatty alcohols such as octadecyl alcohol and the like. Mixtures of the above-mentioned waxes may be used in compositions of this invention.

The amount of waxy materials which is generally admixed with the asphaltic bitumen base may vary from between about 5 to 25% and preferably in the range of 8 to 15%.

The other constituent of the base composition of this invention is a fixed fatty oil and may be of the animal, vegetable or marine family. The fixed fatty oil and mixtures thereof is generally used in amounts of between about 0.05 to 10% and preferably between 1 and 4% and may be selected from:

I. Animal oils:

Tallow (beef, mutton, goat, etc.) oils
Lard oil
Bone oil
Neat's-foot oil
Wool fat
Horse foot oil, etc.

II. Vegetable oils:
Castor
Cashew nut
Peanut
Cocoanut
Jojoba seed
Olive
Olive kernel
Palm
Palm kernel oils
Corn
Cottonseed
Kapok
Rapeseed
Ravison
Sesame
Sunflower
Teaseed
Rice bran oils, etc.

III. Marine and fish oils:
Codfish
Codliver
Dogfish
Dolphin body
Dolphin fish
Herring
Japfish
Menhaden
Porpoise body and jaw
Salmon
Sardine and sardine liver
Seal
Shark
Shark liver oils
Sperm whale body and head oils, etc.

Base compositions of this invention before application are generally diluted with a light hydrocarbon so as to facilitate the application of the base on to a metal surface. Generally about equal parts of the base and diluent are admixed and the composition applied to metal surfaces requiring protection against corrosion by spraying, brushing, swabbing, dipping or by any other suitable means. Diluents which may be used are kerosene, mineral seal oil, gas oil, various petroleum naphtha cuts, mineral spirits kerosene $SO_2$ extract, light mineral lubricating oil, aromatic solvents, petroleum ethers, liquid paraffinic hydrocarbons such as octane, iso-octane, dodecane, cycloparaffins, e. g. cyclohexane, methylcyclohexane, etc., can be used.

A general formula of base compositions of this invention contains the following components by weight:

| | Broad range, percent by weight | Preferred range, percent by weight |
| --- | --- | --- |
| Asphaltic bitumen | 35–75 | 40–50 |
| Fixed fatty oil | 0.05–10 | 1–4 |
| Waxy Hydrocarbon | 5–25 | 8–15 |
| Light Hydrocarbon boiling below the lubricating oil range | 0–70 | 35–45 |

This base is diluted with approximately equal parts by weight of a light liquid hydrocarbon diluent.

Compositions of this invention can be made by the following blending procedure in order to obtain a smooth blend.

A desired amount of asphalt is heated to approximately 300° F. and the heating thereafter discontinued. A light hydrocarbon such as mineral spirits is added slowly with agitation until a blend of approximately 85% asphalt and 15% mineral spirits is obtained. Additional mineral spirits is added and the blend allowed to cool to between 135° and 200° F. This blend is designated as blend X.

A second blend (Y) is prepared by melting a waxy-hydrocarbon such as petrolatum at around about 175° F. and thereafter cooled to about 135° F. with vigorous agitation. At this temperature a minor amount of mineral spirits or the like is added if desired.

Blends X and Y are blended at around about 135° F. with agitation and if desired a fatty material such as lard oil can be added. This resulting composition is an excellent rust inhibitor.

A specific example of a rust inhibiting composition (henceforth designated as composition A) of this invention comprises:

| | Per cent by weight |
|---|---|
| Light VI asphalt (S. P. 175) | 50 |
| No. 1 lard oil | 2 |
| Short residue petrolatum | 10 |
| Mineral spirits | 38 |

Composition A and the best available commercial rust inhibiting composition were subjected to the AN–VV–C–576a Army-Navy test and the results compared. The test consists of dipping test panel of 2 by 4 by 1/32 inch sand blasted panels of steel conforming to Specification AN–QQ–S–676 into test composition so as to completely submerge all surfaces. The panels are then suspended vertically by glass hooks for about four hours in dry atmosphere and at a temperature of 77±5° F. The panels are then suspended vertically in a humidity cabinet maintained at a relative humidity of 95 to 100% and a temperature of 120±5° F. for a period of 150 hours. At the end of this period the panels were removed from the cabinet, cleaned with naphtha and examined for corrosion in accordance with the conditions of the specification.

| | Composition | Condition of Panel at End of Test |
|---|---|---|
| 1 | Commercial rust inhibitor | Panel rusted and failed test. |
| 2 | Composition A of this invention. | Panel perfectly clean and passed test. |

Steel panels were also subjected to U. S. Army Specification test AXS–934 (Rev. 1) and passed the test while a lubricating oil and a commercial rust inhibiting composition failed the tests.

*Humidity cabinet test*

Sand-blasted steel panels of approximately 2" x 3" x 1/16" were immersed in test composition for one minute and then allowed to dry for 16 hours at 130°±5° F. before being transferred to a humidity cabinet. The panels were kept in the cabinet in an atmosphere of 95 to 100% relative humidity and at 100°±2° F. for 200 hours and thereafter inspected for corrosion.

| Composition | Condition of Panel After Test |
|---|---|
| Lubricating oil | Failed, corroded badly. |
| Commercial product | Failed. |
| Composition A of this invention | Passed, no corrosion. |

Composition of this invention may be modified by addition thereto of corrosion inhibitors such as salts of organic acids, e. g. salicylate, sulfonates, naphthenates, oleates, sulfonated and sulfated fixed fatty oils, amine salts of fatty acids, paramine oleate, dicyclohexylamine oleate, oxazoline salts of sulfonic, ricinoleic acids, etc.; salts of inorganic acids, e. g. metal phosphates, methyl oleyl Al phosphate; organic esters, e. g. dilorol phosphate, dilauryl phosphite, polycarboxylic acids, e. g. alkyl succinic acid, organic amines, inorganic compounds, e. g. sodium and lithium nitrite, sodium chromate, etc.

Compositions of this invention may if desired be very easily removed by flushing, wiping or by any other suitable means.

Many modifications and variations of this invention as hereinbefore set forth may be made without departing from the spirit and scope therefor and therefore only such limitation should be imposed as indicated in the appended claims.

I claim as my invention:

1. A composition of matter adapted for use as a rust inhibitor for metals containing the following constituents in the following proportions.

| Additive: | Per cent by weight |
|---|---|
| Light VI asphalt (175 S. P.) | 50 |
| No. 1 lard oil | 2 |
| Short residue petrolatum | 10 |
| Mineral spirits | 38 |

2. A composition of matter adapted for use as a rust inhibitor containing the following components in the following proportions:

| Additive: | Per cent by weight |
|---|---|
| Asphaltic bitumen | 35–75 |
| Fixed oil | 2–10 |
| Waxy hydrocarbon | 5–25 | said component mixture being diluted with a major amount of a light liquid hydrocarbon.

3. A rust inhibiting base composition consisting essentially of an asphaltic bitumen having incorporated therein from 2% to 10% of an animal oil and from 5% to 25% of a non-aromatic petroleum wax, said base composition being diluted with approximately equal parts of a light liquid hydrocarbon.

4. A rust inhibiting base composition consisting essentially of an asphaltic bitumen having incorporated therein from 2% to 10% of lard oil and from 5% to 25% of a non-aromatic petroleum wax, said base being diluted with approximately equal parts of a light liquid hydrocarbon.

5. A rust inhibiting base composition consisting essentially of an asphaltic bitumen having incorporated therein from 2% to 10% of lard oil and from 5% to 25% of petrolatum, said base being diluted with approximately equal parts of a light liquid hydrocarbon.

6. A rust inhibiting base composition consisting essentially of an asphaltic bitumen having incorporated therein from 2% to 10% of lard oil and from 5% to 25% of slop wax, said base being diluted with approximately equal parts of a light liquid hydrocarbon.

7. A rust inhibiting base composition consisting essentially of an asphaltic bitumen having incorporated therein from 2% to 10% of lard oil and from 5% to 25% of slop wax, said base being diluted with approximately equal parts of mineral spirits.

KNAPEL F. SCHIERMEIER.

REFERENCES CITED

The following references are of record in the file of this patent:

UNITED STATES PATENTS

| Number | Name | Date |
|---|---|---|
| 1,226,889 | Jacobs | May 22, 1917 |
| 1,460,317 | Duke | June 26, 1923 |
| 2,115,425 | McGrew | Apr. 26, 1938 |
| 2,291,905 | Koenig | Aug. 4, 1942 |
| 2,298,793 | Holmes | Oct. 13, 1942 |